N. JOHNSON.
Insertible Saw-Teeth.
No. 211,097. Patented Jan. 7, 1879.
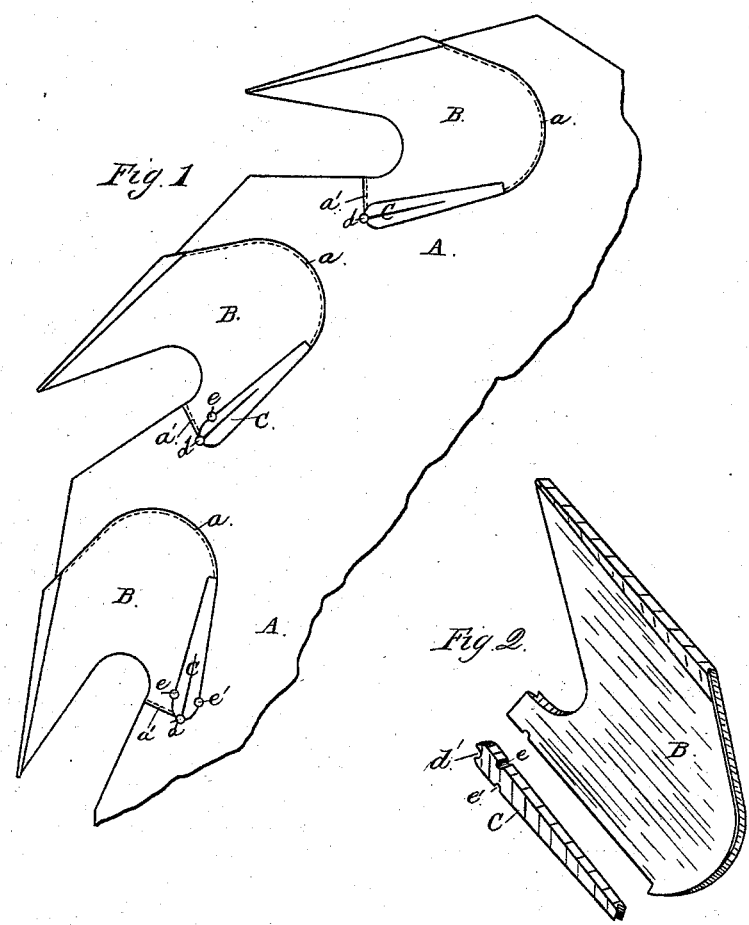

UNITED STATES PATENT OFFICE.

NELSON JOHNSON, OF JASPER, NEW YORK.

IMPROVEMENT IN INSERTIBLE SAW-TEETH.

Specification forming part of Letters Patent No. 211,097, dated January 7, 1879; application filed June 3, 1878.

*To all whom it may concern:*

Be it known that I, NELSON JOHNSON, of Jasper, in the county of Steuben and State of New York, have invented a new and useful Improvement in Inserted-Tooth Saws, of which the following is a specification:

The teeth of my improved saw are inserted in sockets, with V-grooves to hold the heel and shank of the tooth.

My improvement consists, particularly, in the introduction of a wedge-shaped gib, formed with a V groove or notch at its small end and held by one or more rivets at its large end, the large end being preferably split, so that it may be spread by the insertion of the key-rivet, and will thus afford a firm bearing for the shank of the tooth and prevent it from rolling in its socket.

In order that my invention may be fully understood, I will proceed to describe it, with reference to the accompanying drawings, in which—

Figure 1 is a side view of a portion of a circular saw illustrating the invention. Fig. 2 is a perspective view of the tooth and gib detached.

A represents a part of a circular-saw plate. B is one of my improved insertible teeth, constructed in its heel and in the extremity of its shank with V-shaped grooves, adapted to fit the V-tongues $a\ a'$ in the ends of the socket in the plate. C is my improved wedge-shaped gib, which fits an aperture of corresponding shape left for it at the back of the tooth-shank, the larger end of the gib being toward the extremity of the shank, and the small end to the heel. The small end has a V shaped notch or groove fitting a corresponding tongue projecting forward from the heel of the tooth, so as to secure the small end of the gib from lateral displacement when it is in position. The gib is preferably split longitudinally from its large end for about one-half its length, and is formed at its large end with a hole, $d'$, for the reception of a rivet, $d$, which, when inserted, expands, the split end of the gib forcing the shank of the tooth outward against its inclined bearing and preventing it from rolling in its socket.

As an inferior modification, I propose to employ a rivet-hole, $e\ e'$, either over or under the gib, to key it in its seat and secure it against lateral displacement.

My mode of raising the shank of the tooth tightly over or upon the tongue, which holds it in its groove, secures it much more effectually than can be done with a tooth which depends upon rivet-heads for securing it against lateral displacement and side wear.

My mode of riveting the gib avoids strain to the periphery of the saw, and avoids the necessity of riveting up very tight, as the shank of the tooth is held from swinging out of place by the V-groove, the gib requiring but one rivet to hold it in place.

Having thus described my invention, the following is what I claim as new, and desire to secure by Letters Patent—

1. An inserted saw-tooth, set in a dovetailed recess in the plate, and forced outward therein by a wedge-shaped gib, C, applied transversely to the radius and secured by a notch or groove at one end and one or more rivets at the other, substantially as herein described.

2. The combination of the tooth B, set in a dovetailed recess, as specified, and the wedge-shaped gib C, split at its larger end and expanded by a rivet, $d$.

NELSON JOHNSON.

Witnesses:
N. M. CRANE,
S. H. CRANE.